United States Patent
Xu et al.

(10) Patent No.: US 11,071,142 B2
(45) Date of Patent: Jul. 20, 2021

(54) UPLINK TRANSMISSION METHOD BASED ON LICENSED-ASSISTED ACCESS LAA SYSTEM, AND APPARATUS

(71) Applicant: Huawei Technologies Co., Ltd., Shenzhen (CN)

(72) Inventors: Kai Xu, Shenzhen (CN); Xiaocui Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 75 days.

(21) Appl. No.: 16/099,001

(22) PCT Filed: May 4, 2016

(86) PCT No.: PCT/CN2016/081001
§ 371 (c)(1),
(2) Date: Nov. 5, 2018

(87) PCT Pub. No.: WO2017/190294
PCT Pub. Date: Nov. 9, 2017

(65) Prior Publication Data
US 2019/0159252 A1    May 23, 2019

(51) Int. Cl.
*H04W 74/08* (2009.01)
*H04W 16/14* (2009.01)
(Continued)

(52) U.S. Cl.
CPC ..... *H04W 74/0808* (2013.01); *H04L 27/2636* (2013.01); *H04W 16/14* (2013.01); *H04W 72/1268* (2013.01); *Y02D 30/70* (2020.08)

(58) Field of Classification Search
CPC .......................................... H04W 74/08–0891
See application file for complete search history.

(56) References Cited

U.S. PATENT DOCUMENTS

2013/0065580 A1    3/2013  Hassan et al.
2015/0289208 A1   10/2015  Liu et al.
(Continued)

FOREIGN PATENT DOCUMENTS

CN     104994591 A    10/2015
CN     105227282 A     1/2016
(Continued)

OTHER PUBLICATIONS

Foreign Communication From a Counterpart Application, Russian Application No. 2018141587, Russian Notice of Allowance with partial English translation dated Jun. 10, 2019, 24 pages.
(Continued)

*Primary Examiner* — Marcus Smith
(74) *Attorney, Agent, or Firm* — Conley Rose, P.C.

(57) ABSTRACT

An uplink transmission method based on a licensed-assisted access (LAA) system, and an apparatus, where the method includes reserving, for a transmission burst transmitted on an unlicensed carrier, at least one single-carrier frequency-division multiple access (SC-FDMA) symbol in a subframe of an uplink transmission burst corresponding to the transmission burst, where in the reserved at least one SC-FDMA symbol, user equipment (UE) accesses a channel using a listen-before-talk (LBT) access mechanism. Hence, a time gap for accessing the channel through LBT can be reserved for another UE in the uplink transmission burst. This improves a probability of successfully accessing the channel by another UE such that a plurality of UEs in an LAA communications system can perform uplink multiplexing.

20 Claims, 8 Drawing Sheets

(51) Int. Cl.
*H04L 27/26* (2006.01)
*H04W 72/12* (2009.01)

(56) References Cited

U.S. PATENT DOCUMENTS

| 2016/0007368 | A1 | 1/2016 | Moon et al. | |
|---|---|---|---|---|
| 2016/0099799 | A1 | 4/2016 | Bashar et al. | |
| 2016/0143014 | A1* | 5/2016 | Mukherjee | H04W 74/0816 370/330 |
| 2017/0085346 | A1* | 3/2017 | Tiirola | H04L 5/0055 |
| 2017/0094681 | A1 | 3/2017 | Takeda et al. | |
| 2017/0135128 | A1* | 5/2017 | Yerramalli | H04W 74/0808 |
| 2017/0288823 | A1 | 10/2017 | Bhushan et al. | |
| 2018/0110057 | A1* | 4/2018 | Park | H04B 7/0404 |
| 2018/0124749 | A1* | 5/2018 | Park | H04W 74/08 |
| 2018/0206269 | A1* | 7/2018 | Bhorkar | H04W 72/14 |
| 2019/0289635 | A1* | 9/2019 | Wang | H04W 72/14 |

FOREIGN PATENT DOCUMENTS

| CN | 105230062 A | 1/2016 |
|---|---|---|
| EP | 3439414 A1 | 2/2019 |
| RU | 2557258 C2 | 7/2015 |
| WO | 2015174437 A1 | 11/2015 |
| WO | 2016048227 A2 | 3/2016 |
| WO | 2017134527 A1 | 8/2017 |

OTHER PUBLICATIONS

Samsung, "Discussion on Category 2 LBT for UL transmission," XP051001508, R1-154138, 3GPP TSG RAN WG1 Meeting #82, Beijing, China, Aug. 24-28, 2015, 5 pages.

Catt, "UL LBT framework for LAA" XP051002160, R1-155191, 3GPP TSG RAN WG1 Meeting #82bis, Malmo, Sweden, Oct. 5-9, 2015, 4 pages.

ZTE Microelectronics Technology, et al.,"Frame design and signalling for LAA UL based on F53," XP051079545, R1-162327, Frame design and signalling for LAA UL based on FS3, Busan, Korea, Apr. 11-15, 2016, 5 pages.

Nokia, et al., "Channel Access for LAA UL," 3GPP TSG RAN WG1 Meeting #84bis, Busan, South Korea, XP051080412, R1-162920, Apr. 11-15, 2016, 9 pages.

Foreign Communication From a Counterpart Application, European Application No. 16900816.6, Extended European Search Report dated Feb. 26, 2019, 13 pages.

Machine Translation and Abstract of Chinese Publication No. CN104994591, dated Oct. 21, 2015, 31 pages.

Machine Translation and Abstract of Chinese Publication No. CN105227282, dated Jan. 6, 2016, 16 pages.

"3rd Generation Partnership Project; Technical Specification Group Radio Access Network; Evolved Universal Terrestrial Radio Access (E-UTRA); Multiplexing and channel coding (Release 12)," 3GPP TS 36.212, V12.8.0, Mar. 2016, 95 pages.

Huawei, et al., "UL LBT to enable UE multiplexing of uplink transmissions," 3GPP TSG RAN WG1 Meeting #84, R1-160280, Feb. 15-19, 2016, 6 pages.

Foreign Communication From a Counterpart Application, PCT Application No. PCT/CN2016/081001, English Translation of International Search Report dated Jan. 24, 2017, 3 pages.

Foreign Communication From a Counterpart Application, PCT Application No. PCT/CN2016/081001, English Translation of Written Opinion dated Jan. 24, 2017, 3 pages.

* cited by examiner

UPLINK TRANSMISSION METHOD BASED ON LICENSED-ASSISTED ACCESS LAA SYSTEM, AND APPARATUS

CROSS-REFERENCE TO RELATED APPLICATIONS

This application is a U.S. Nation Stage of International Patent Application No. PCT/CN2016/081001 filed on May 4, 2016, which is hereby incorporated by reference in its entirety.

TECHNICAL FIELD

The present invention relates to the field of communications technologies, and in particular, to an uplink transmission method based on a licensed-assisted access LAA system, and an apparatus.

BACKGROUND

Although mobile communications technologies keep evolving and mobile communications networks are becoming more mature, a sharp increase in mobile data traffic remains a real challenge for operators. Under this persistent pressure, the operators pay more attention to efficient utilization of unlicensed (Unlicense) spectrum resources. Therefore, a licensed-assisted access using Long Term Evolution (Licensed-Assisted Access Using Long Term Evolution, LAA-LTE) technology emerges.

LAA is a part of the 3GPP LTE Advanced Pro Release 13 specification. As defined, LAA means that an LTE network technology is used for an unlicensed frequency band; based on a carrier aggregation architecture, a carrier in a licensed frequency band is used as a primary cell (PCell), and a carrier on the unlicensed frequency band can be used only as a secondary cell (SCell). In addition, to ensure coexistence with another technology used in the unlicensed frequency band, a listen-before-talk (Listen-Before-Talk, LBT) channel contention access mechanism is used. LBT is a carrier sense multiple access (Carrier Sense Multiple Access, CSMA) technology.

In an LAA system, a plurality of user equipments (User Equipment, UE) may perform uplink multiplexing (Multiplexing). However, as shown in FIG. 1, if all symbols of uplink subframes N+4, N+5, and N+6 are used to send data, a channel is always being occupied, and another UE cannot access the channel. As a result, a plurality of UEs cannot perform uplink multiplexing.

SUMMARY

Embodiments of the present invention provide an uplink transmission method based on a licensed-assisted access LAA system, and an apparatus, to reserve, for another UE in an uplink transmission burst, a time gap for accessing a channel through LBT. This improves a probability of successfully accessing the channel by the another UE, so that a plurality of user equipments in an LAA communications system can perform uplink multiplexing.

According to a first aspect, an uplink transmission method based on a licensed-assisted access LAA system is provided, including: for a transmission burst transmitted on an unlicensed carrier, reserving at least one SC-FDMA symbol in a subframe of an uplink transmission burst corresponding to the transmission burst, where in the reserved at least one SC-FDMA symbol, user equipment accesses a channel by using a listen-before-talk LBT access mechanism.

With reference to the first aspect, in a possible implementation, at least one SC-FDMA symbol may be reserved at a start position and/or an end position of each subframe of the uplink transmission burst. In this way, a time gap for accessing the channel through LBT can be reserved for another UE at the start position and/or the end position of each subframe, so as to implement uplink multiplexing for a plurality of UEs.

With reference to the first aspect, in a possible implementation, at least one SC-FDMA symbol may be periodically reserved at start positions and/or end positions of some subframes of the uplink transmission burst. In this way, a time gap for accessing the channel through LBT can be periodically reserved for another UE at the start positions and/or end positions of the some subframes of the uplink transmission burst, so as to implement uplink multiplexing for a plurality of UEs.

With reference to the first aspect, in a possible implementation, at least one SC-FDMA symbol may be reserved at a start position and/or an end position of a specified subframe of the uplink transmission burst.

With reference to the first aspect or with reference to the foregoing several possible implementations of the first aspect, in some possible implementations, the at least one SC-FDMA symbol may be a low power transmit symbol. Some frequency resources in the low power transmit symbol in this embodiment of the present invention are allowed to be occupied. In addition, on an unoccupied frequency resource in the ABS symbol, the user equipment may access the channel by using the listen-before-talk LBT access mechanism. In this way, this may avoid that a Wi-Fi access point accesses an idle channel through LBT in the reserved at least one SC-FDMA symbol, and consequently LAA-LTE user equipment cannot successfully access the channel (or an access success probability of the LAA-LTE user equipment is reduced).

In some possible implementations, to satisfy a stipulation, about a frequency feature of the low power transmit symbol, of the European Telecommunications Standards Institute (ETSI) (European Telecommunications Standards Institute) (that is, a frequency allowed to be occupied in the low power transmit symbol needs to span 80% of an entire bandwidth), the frequency allowed to be occupied in the low power transmit symbol may be distributed in resource blocks at both ends of the entire system bandwidth.

In this embodiment of the present invention, the reserved at least one SC-FDMA symbol may be configured by using higher layer configuration signaling (for example, RRC signaling), a physical downlink ornitrol channel (PDCCH), or the like, where at least one of the following options is specifically included: a quantity of reserved SC-FDMA symbols, a position of the reserved SC-FDMA symbol in a subframe, a type of the reserved SC-FDMA symbol, and a period and an offset of the reserved SC-FDMA symbol.

In this embodiment of the present invention, a subframe including the reserved SC-FDMA symbol may be configured by using higher layer configuration signaling (for example, RRC signaling), a physical downlink ornitrol channel (PDCCH), or the like, where at least one of the following options is specifically included: a quantity of subframes including the reserved SC-FDMA symbol, a position of the subframe including the reserved SC-FDMA symbol in the uplink transmission burst, and a period and an offset of the subframe including the reserved SC-FDMA symbol.

According to a second aspect, a communications network apparatus is provided, including a memory and a processor coupled with the memory. The memory is configured to store code for implementing the method described in the first aspect. The processor is configured to execute program code stored in the memory, that is, perform the uplink transmission method based on a licensed-assisted access LAA system described in the first aspect.

According to a third aspect, a communications network apparatus is provided, including units configured to perform the method in the first aspect.

In the embodiments of the present invention, the at least one SC-FDMA symbol is reserved in the subframe of the uplink transmission burst. In the reserved at least one SC-FDMA symbol, the user equipment may access the channel by using the listen-before-talk LBT access mechanism. In this way, a time gap for accessing the channel through LBT can be reserved for another UE in the uplink transmission burst, and a probability of successfully accessing the channel by the another UE is improved, so that a plurality of user equipments in an LAA communications system can perform uplink multiplexing.

BRIEF DESCRIPTION OF DRAWINGS

To describe the technical solutions in the embodiments of the present invention more clearly, the following briefly describes the accompanying drawings required for describing the embodiments.

DESCRIPTION OF EMBODIMENTS

Terms used in embodiments of the present invention are merely used to explain specific embodiments of the present invention, but are not intended for limiting the present invention.

Figure 2:
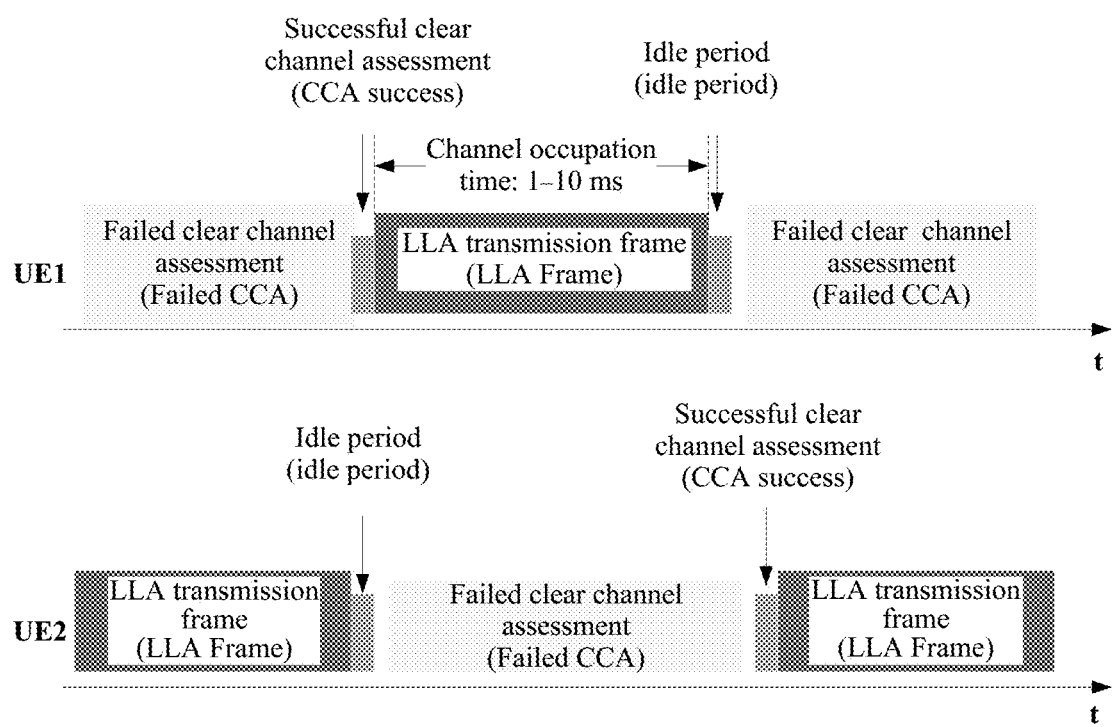
FIG. 2 is a schematic diagram of a listen-before-talk LBT access mechanism according to an embodiment of the present invention.

As shown in FIG. 2, a listen-before-talk LBT access mechanism in the embodiments of the present invention is: In an LAA communications system, before sending data each time, a node (for example, UE2) first listens on a channel to determine whether the channel is idle; and if the channel is not idle (that is, clear channel assessment (Clear Channel Assessment, CCA) fails), the node does not first access the channel (that is, does not send the data), but attempts to perform access again after a period of time. In other words, the node can access the channel only when the channel is idle (that is, clear channel assessment CCA is successful), thereby avoiding interrupting an ongoing transmission process of another node. It should be noted that FIG. 2 is merely an example, is used to help describe the embodiments of the present invention, and should not constitute any limitation. It should be understood that the LAA communications system may include two or more communications nodes (not limited to UE1 and the UE2 in FIG. 2).

The embodiments of the present invention provide an uplink transmission method based on a licensed-assisted access LAA system, and an apparatus, to reserve, for another UE in an uplink transmission burst, a time gap for accessing a channel through LBT. This improves a probability of successfully accessing the channel by the another UE, so that a plurality of user equipments in an LAA communications system can perform uplink multiplexing.

A main inventive concept of the solutions in the present invention includes: for a transmission burst transmitted on an unlicensed carrier, at least one SC-FDMA symbol is reserved in a subframe of an uplink transmission burst corresponding to the transmission burst, where in the reserved at least one SC-FDMA symbol, user equipment accesses a channel by using a listen-before-talk LBT access mechanism. In this way, in the reserved at least one SC-FDMA symbol, the channel is in an idle state, and another UE can access the channel through LBT.

Figure 1:
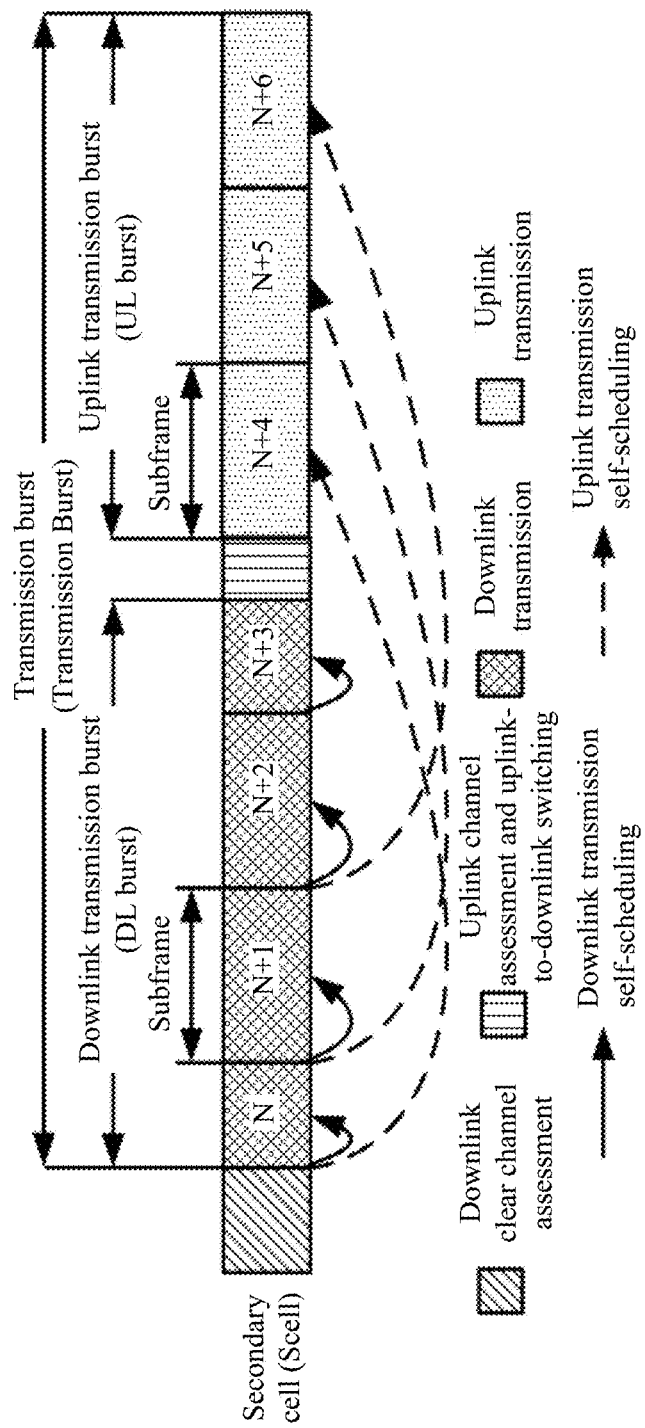
FIG. 1 is a schematic diagram of an application scenario according to an embodiment of the present invention.

Specifically, as shown in FIG. 1, a transmission burst may include a downlink transmission burst and an uplink transmission burst. There is one downlink clear channel assessment (CCA for DL) before each downlink transmission burst. The downlink transmission burst and the uplink transmission burst are separated by one uplink clear channel assessment (CCA for UL) and one downlink-to-uplink switching (Downlink-to-Uplink switching) period. It should be noted that FIG. 1 is merely an example of a transmission burst and should not constitute any limitation.

In this embodiment of the present invention, an uplink transmission burst (UL transmission burst) is one transmission that is continuous in time and that is from the user equipment, and a downlink transmission burst (DL transmission burst) is one transmission that is continuous in time and that is from a downlink transmission node (for example, a base station). Quantities of subframes included in the downlink transmission burst and the uplink transmission burst are not limited by the drawings. For definitions of the uplink and downlink transmission bursts, refer to descriptions in the 3GPP TR 36.889 protocol. Details are not described herein.

The following describes the embodiments of the present invention in detail with reference to the drawings.

Figure 3A:
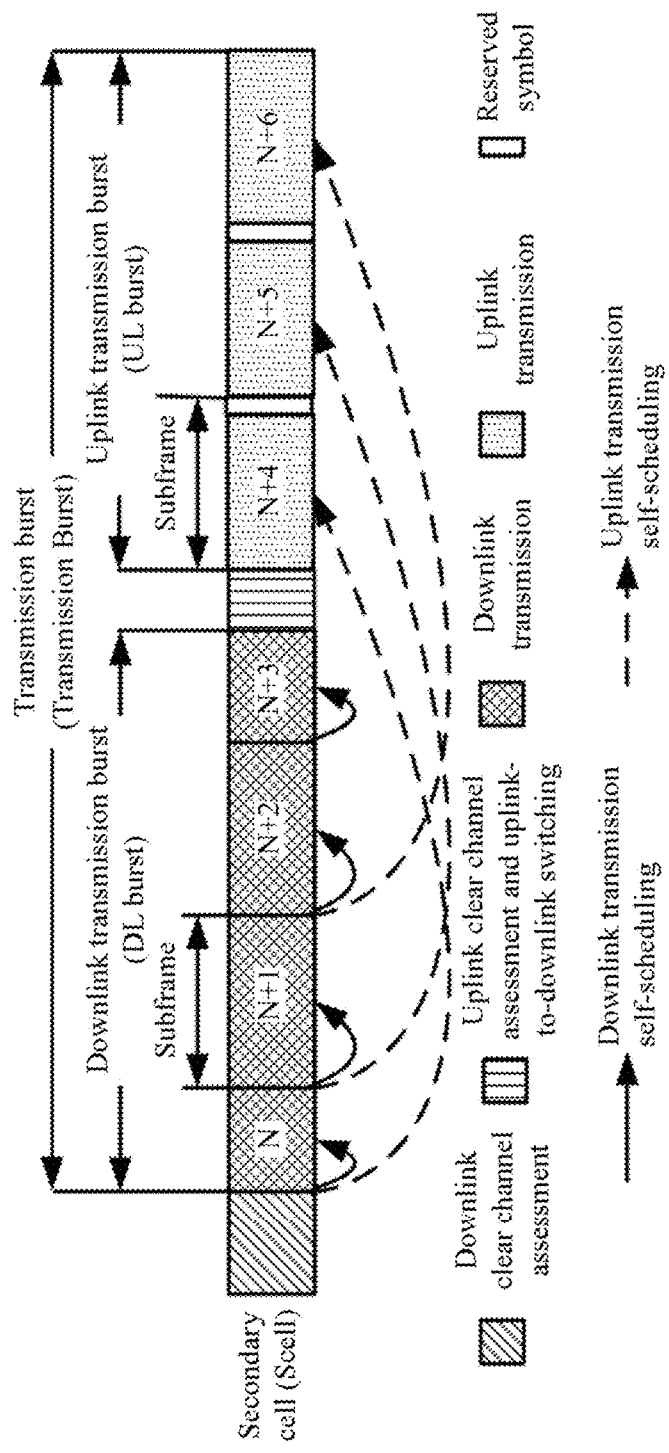
FIG. 3A to FIG. 3C are schematic diagrams of several SC-FDMA symbol reservation methods according to an embodiment of the present invention.
Figure 3B:
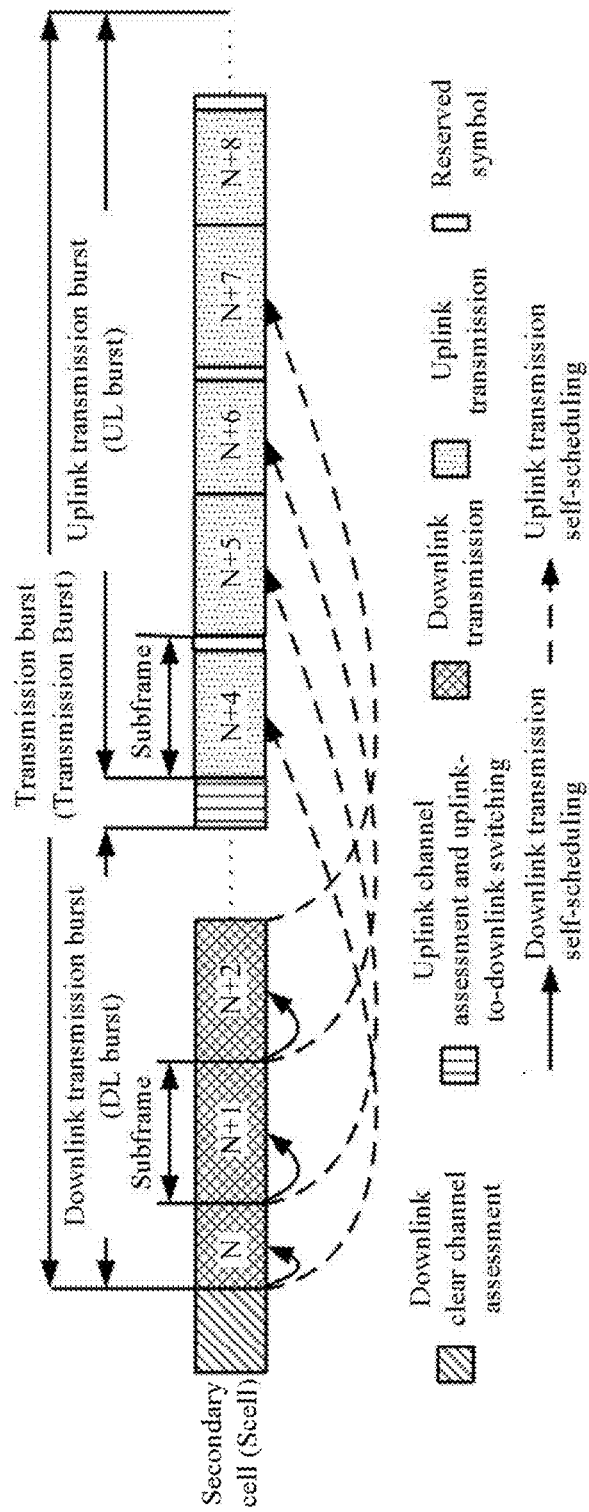
Figure 3C:
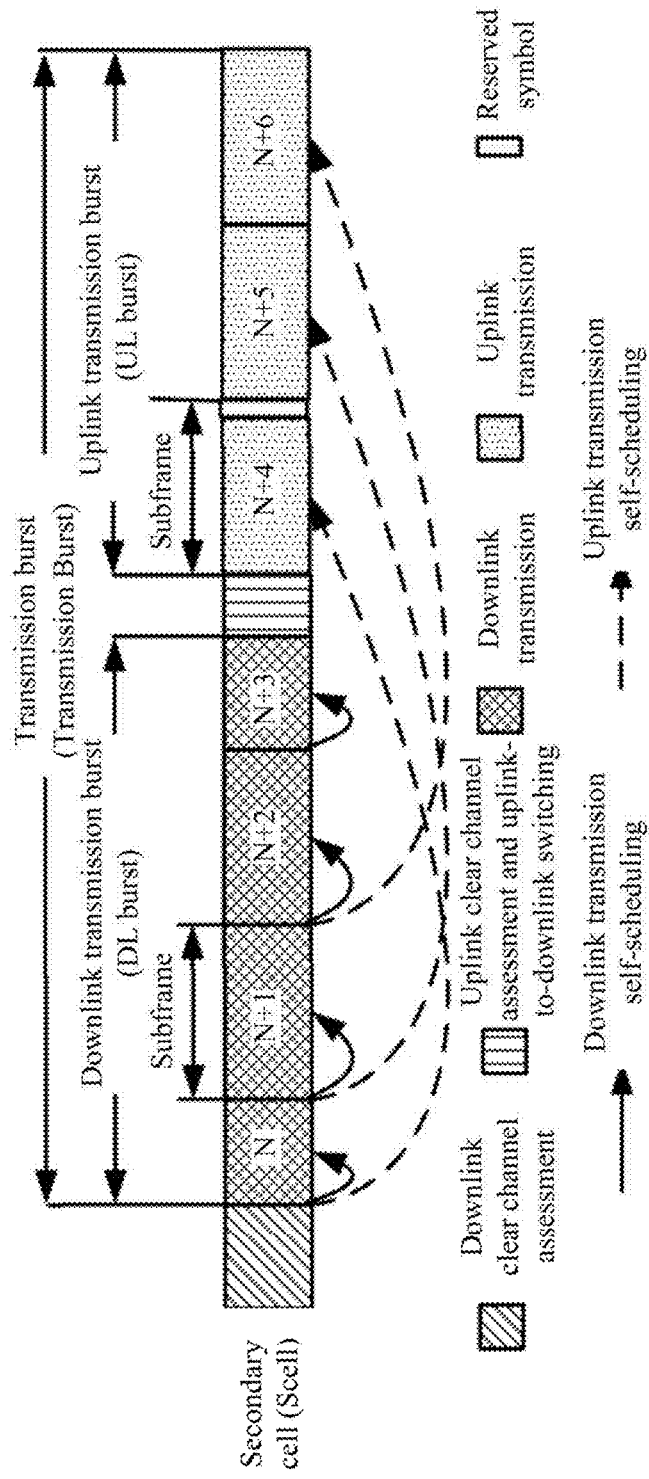

First, FIG. 3A to FIG. 3C show several symbol reservation methods provided in the embodiments of the present invention.

As shown in FIG. 3A, at least one SC-FDMA symbol may be reserved at a start position and/or an end position of each subframe of the uplink transmission burst. In this way, a time gap for accessing the channel through LBT can be reserved for another UE at the start position and/or the end position of each subframe, so as to implement uplink multiplexing for a plurality of UEs.

Herein, "and/or" may include the following several cases: the SC-FDMA symbol is reserved at the start position of each subframe, the SC-FDMA symbol is reserved at the end position of each subframe, and the SC-FDMA symbol is reserved at both the start position and the end position of each subframe.

During specific implementation, as shown in FIG. 3A, because a channel access operation (for example, CCA for UL) is performed before a first subframe (for example, a subframe N+4 in the figure) of the uplink transmission burst, no SC-FDMA symbol needs to be reserved at a start position of the first subframe. In other words, the reserved at least one SC-FDMA symbol does not include an SC-FDMA symbol at the start position of the first subframe of the uplink transmission burst.

During specific implementation, as shown in FIG. 3A, because no uplink data is transmitted after a last subframe (for example, a subframe N+6 in the figure) of the uplink transmission burst, no SC-FDMA symbol needs to be reserved at an end position of the last subframe. In other words, the reserved at least one SC-FDMA symbol does not include an SC-FDMA symbol at the end position of the last subframe of the uplink transmission burst.

In a possible implementation, a different quantity of SC-FDMA symbols may be correspondingly reserved depending on an access time required in a different channel access scheme.

For example, uplink communication in LAA supports two LBT channel access schemes. One is an uplink LBT access scheme based on a category-4 channel access procedure (Category-4 channel access procedure). The other is a fast channel access scheme, and the scheme is an uplink LBT access scheme in which direct access to a channel can be performed as long as it is detected that the channel is idle for 25 μs or longer. An access time required in the fast channel access scheme is relatively short (equal to or slightly greater than 25 μs), and an access time required in a category-4 uplink LBT access mode is relatively long. Therefore, if the fast channel access scheme is used, one SC-FDMA symbol may be reserved at the start or end position of each subframe of the uplink transmission burst. If the uplink LBT access scheme based on category 4 is used, two SC-FDMA symbols may be reserved at the start or end position of each subframe of the uplink transmission burst. The example is merely an implementation of this embodiment of the present invention, and should not constitute any limitation. A different implementation may alternatively be used in actual application.

It should be noted that a quantity of reserved SC-FDMA symbols is not limited in this embodiment of the present invention. During specific implementation, a quantity of SC-FDMA symbols that need to be reserved may be determined depending on an actual application requirement.

As shown in FIG. 3B, at least one SC-FDMA symbol may be periodically reserved at start positions and/or end positions of some subframes of the uplink transmission burst. In this way, a time gap for accessing the channel through LBT can be periodically reserved for another UE at the start positions and/or end positions of the some subframes of the uplink transmission burst, so as to implement uplink multiplexing for a plurality of UEs.

For example, as shown in FIG. 3B, a symbol reservation period T is equal to 2 subframes, in other words, symbol reservation may be performed mice at an interval of 2 subframes. In this way, an SC-FDMA symbol may be reserved in each of a subframe N+4, a subframe N+6, and a subframe N+8. The example is merely an implementation of this embodiment of the present invention. In actual application, the symbol reservation period may alternatively be another value, and no limitation is imposed herein.

It may be understood that the symbol reservation period T may alternatively be expressed by a symbol. For example, if the symbol reservation period T is equal to 2 subframes and one subframe includes N (N is a positive integer) symbols, the symbol reservation period T may also be expressed as 2*N symbols.

In a possible implementation, there may be a preset offset delta between two adjacent symbol reservation periods.

For example, the symbol reservation period T is equal to 2, and the preset offset delta is equal to +1 subframe. Therefore, SC-FDMA symbols may be reserved at start positions of the subframe N+4, the subframe N+6, a subframe N+9, and a subframe N+13. In other words, every other period T, a symbol is reserved in a subframe that is backward deviated by one subframe in time. For another example, the symbol reservation period T is equal to 3, and the preset offset delta is equal to −1 subframe. Therefore, SC-FDMA symbols may be reserved at start positions of the subframe N+4, a subframe N+7, a subframe N+9, and a subframe N+10. In other words, every other period T, a symbol is reserved in a subframe that is forwards deviated by one subframe in time. The example is merely an implementation of this embodiment of the present invention, and should not constitute any limitation. A different implementation may alternatively be used in actual application.

It may be understood that the preset offset delta may alternatively be expressed by a symbol. For example, if the preset offset delta is equal to +1 subframe and one subframe includes N (N is a positive integer) symbols, the preset offset delta may also be expressed as +N symbols.

In a possible implementation, the symbol reservation period may be dynamic. For example, a symbol reservation period in an $i^{th}$ uplink transmission burst is 2, and a symbol reservation period in an $(i+1)^{th}$ uplink transmission burst is 3, where i is a positive integer. The example is merely an implementation of this embodiment of the present invention, and should not constitute any limitation. A different implementation may alternatively be used in actual application.

With reference to content of the embodiment in FIG. 3A, it can be learned that the reserved at least one SC-FDMA symbol does not include: an SC-FDMA symbol at a start position of a first subframe of the uplink transmission burst; or an SC-FDMA symbol at an end position of a last subframe of the uplink transmission burst.

With reference to the content of the embodiment in FIG. 3A, it can be learned that a different quantity of SC-FDMA symbols may be correspondingly reserved depending on an access time required in a different channel access scheme. A quantity of reserved SC-FDMA symbols is not limited in this embodiment of the present invention. During specific implementation, a quantity of SC-FDMA symbols that need to be reserved may be determined depending on an actual application requirement.

As shown in FIG. 3C, at least one SC-FDMA symbol may be reserved at a start position and/or an end position of a specified subframe of the uplink transmission burst.

For example, the specified subframe is a first subframe (for example, a subframe N+4 in the figure) of each uplink transmission burst. The example is merely an implementation of this embodiment of the present invention. In actual application, the specified subframe may alternatively be another subframe of an uplink transmission burst, and no limitation should be constituted.

With reference to content of the embodiment in FIG. 3A, it can be learned that if the specified subframe is a first subframe of the uplink transmission burst, the SC-FDMA symbol is reserved only at the end position of the specified subframe; or if the specified subframe is a last subframe of the uplink transmission burst, the SC-FDMA symbol is reserved only at the start position of the specified subframe.

With reference to the content of the embodiment in FIG. 3A, it can be learned that a different quantity of SC-FDMA symbols may be correspondingly reserved depending on an access time required in a different channel access scheme. A quantity of reserved SC-FDMA symbols is not limited in this embodiment of the present invention. During specific implementation, a quantity of SC-FDMA symbols that need to be reserved may be determined depending on an actual application requirement.

It should be noted that the symbol reservation methods respectively corresponding to FIG. 3A to FIG. 3C may be used comprehensively in an uplink transmission process, rather than limited to use of only one of the symbol reservation methods.

It should be noted that, in addition to the symbol reservation methods respectively shown in FIG. 3A to FIG. 3C, the at least one SC-FDMA symbol may alternatively be reserved inside a subframe (neither a start position nor an end position of the subframe). This is not limited herein.

Figure 4:
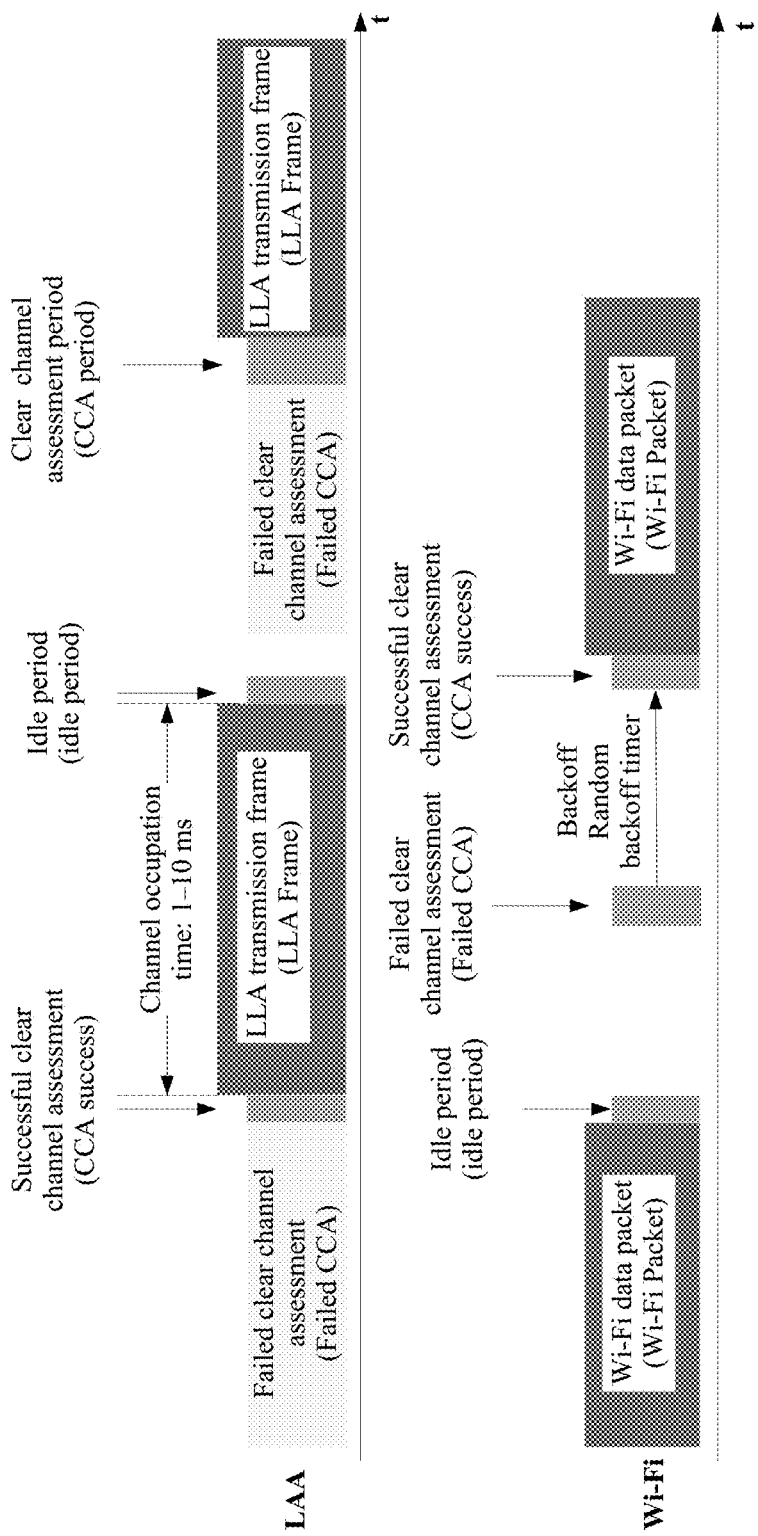
FIG. 4 is a schematic diagram of a listen-before-talk LBT access mechanism in a scenario in which an LAA system and a Wi-Fi system coexist according to an embodiment of the present invention.

It should be understood that a Wi-Fi system and an LAA system coexist on the unlicensed carrier. To avoid mutual interference, the listen-before-talk LBT access mechanism is used for channel access. The LBT mechanism between the Wi-Fi system and the LAA system may be shown in FIG. 4. When a Wi-Fi AP performs channel detection, the AP considers that the channel is in a busy (busy) state if energy of the entire channel exceeds a preset threshold.

In this embodiment of the present invention, the at least one SC-FDMA symbol may be a low power transmit symbol, to avoid that a Wi-Fi access point (Access Point, AP) accesses an idle channel through LBT in the reserved at least one SC-FDMA symbol, and consequently LAA-LTE user equipment cannot successfully access the channel (or an access success rate of the LAA-LTE user equipment is reduced). Some frequency resources in the low power transmit symbol in this embodiment of the present invention are allowed to be occupied. In addition, on an unoccupied frequency resource in the ABS symbol, the user equipment may access the channel by using the listen-before-talk LBT access mechanism. This access manner may be referred to as LBT narrowband access.

It may be understood that, because some resources in the low power transmit symbol are allowed to be occupied, energy of an entire channel in the low power transmit symbol may exceed the preset threshold, so that the Wi-Fi AP determines that the entire channel is in the busy state, and does not occupy the low power transmit symbol. In this way, in the reserved at least one low power transmit symbol, another UE may find, through subband detection, that a part of the channel (an unoccupied frequency band) is in an idle state, and may further access the idle-state part of the channel through LBT.

In a possible implementation, a specified attribute (for example, a Cell Specific attribute) may be configured for the low power transmit symbol by using higher layer signaling, for example, radio resource control (Radio Resource Control, RRC) signaling, so that all UEs in a cell can use the some frequency resources allowed to be occupied in the low power transmit symbol.

In this embodiment of the present invention, according to a related stipulation of the ETSI EN 301 893 standard of the European Telecommunications Standards Institute (ETSI) (European Telecommunications Standards Institute), a frequency feature of the low power transmit symbol needs to meet the following constraint: a frequency allowed to be occupied in the low power transmit symbol needs to span 80% of an entire bandwidth, in other words, a frequency difference between an occupied highest frequency and an occupied lowest frequency needs to reach 80% of the entire bandwidth.

Herein, the frequency allowed to be occupied in the low power transmit symbol may be used by single user equipment, or may be reused by a plurality of user equipments. This is not limited herein.

Figure 5:
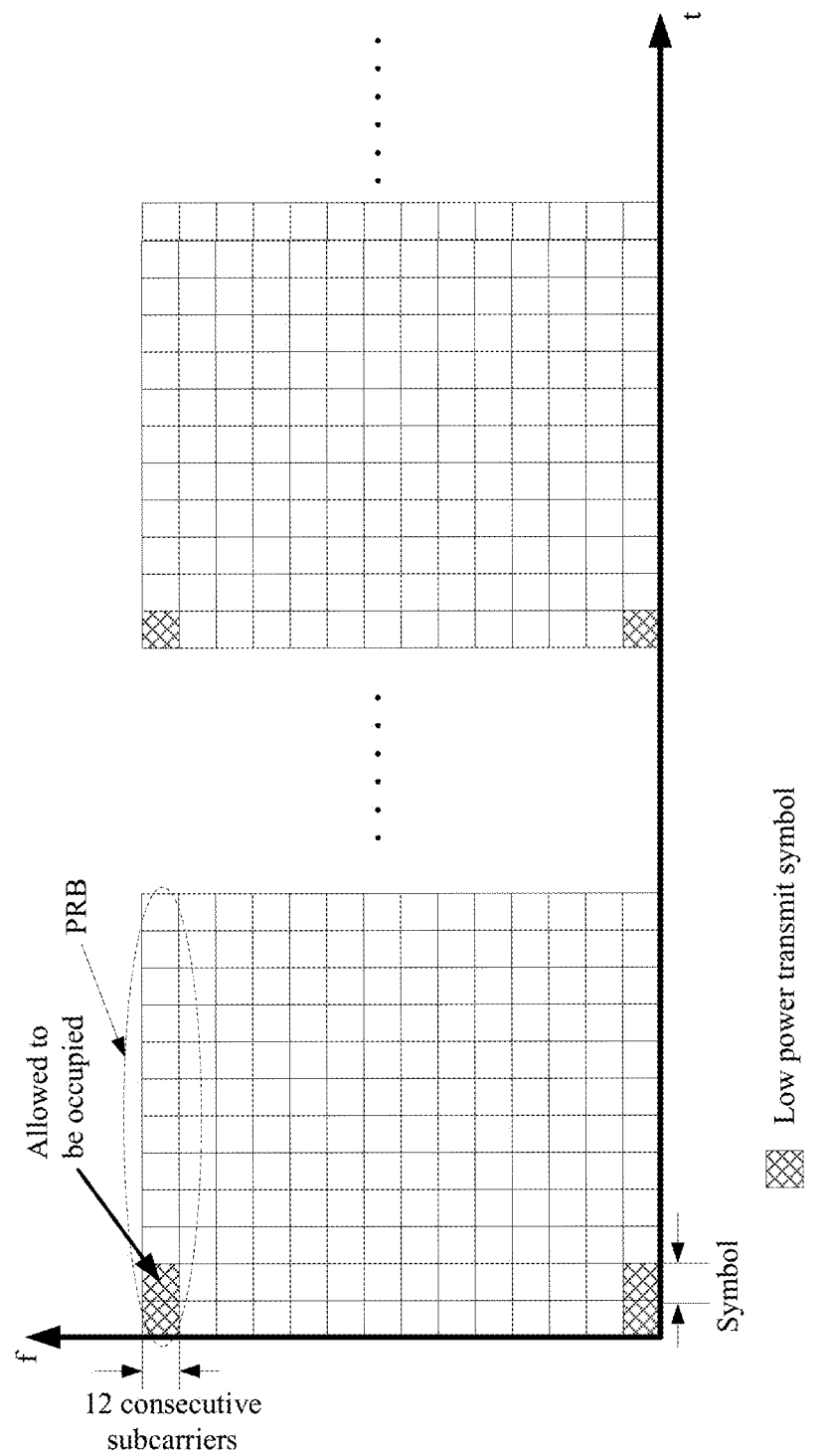
FIG. 5 is a schematic diagram of a frequency domain feature of a low power transmit symbol according to an embodiment of the present invention.

In a possible implementation, to satisfy the stipulation of the ETSI, the frequency allowed to be occupied in the low power transmit symbol may be distributed in resource blocks at both ends of an entire system bandwidth. For example, as shown in FIG. 5, in the low power transmit symbol, the resource blocks at the both ends of the entire system bandwidth may be allowed to be occupied, and a resource block not allowed to be occupied in the middle is reserved for LAA user equipment for LBT-based narrowband access. The example is merely an implementation of this embodiment of the present invention. In actual application, the frequency allowed to be occupied in the low power transmit symbol may alternatively be distributed in another manner, as long as a stipulation, about the frequency feature of the low power transmit symbol, specified by the ETSI is satisfied.

It can be learned from the foregoing content that the reserved at least one SC-SC-FDMA symbol may exist at the start position of the subframe of the uplink transmission burst, at the end position of the subframe of the uplink transmission burst, or inside the subframe of the uplink transmission burst; a quantity of the reserved at least one SC-FDMA symbol may be specifically determined based on an access scheme; a type of the reserved at least one SC-FDMA symbol may be a blank symbol (that is, an entire channel in the symbol is in the idle state), or may be a low power transmit symbol (that is, some frequency resources in the symbol are allowed to be occupied); and the reserved at least one SC-FDMA symbol may periodically exist in some subframes.

During specific implementation, the reserved at least one SC-FDMA symbol may be configured by using higher layer configuration signaling (for example, RRC signaling), a physical downlink control channel (PDCCH), or the like, where at least one of the following options is specifically included: the quantity of reserved SC-FDMA symbols, a position of the reserved SC-FDMA symbol in a subframe, the type of the reserved SC-FDMA symbol, and a period and an offset of the reserved SC-FDMA symbol.

It can be learned from the foregoing content that the reserved at least one SC-FDMA symbol may exist in each subframe of the uplink transmission burst, or periodically exist in some subframes, or exist in die specified subframe.

During specific implementation, a subframe including the reserved SC-FDMA symbol may be configured by using higher layer configuration signaling (for example, RRC signaling), a physical downlink control channel (PDCCH), or the like, where at least one of the following options is specifically included: a quantity of subframes including the reserved SC-FDMA symbol, a position of the subframe including the reserved SC-FDMA symbol in the uplink transmission burst, and a period and an offset of the subframe including the reserved SC-FDMA symbol.

In this embodiment of the present invention, the at least one SC-FDMA symbol is reserved in the subframe of the uplink transmission burst. In the reserved at least one SC-FDMA symbol, the user equipment may access the channel by using the listen-before-talk LBT access mechanism. In this way, a time gap for accessing the channel through LBT can be reserved for another UE in the uplink transmission burst, and a probability of successfully accessing the channel by the another UE is improved, so that a plurality of user equipments in an LAA communications system can perform uplink multiplexing.

Figure 6:
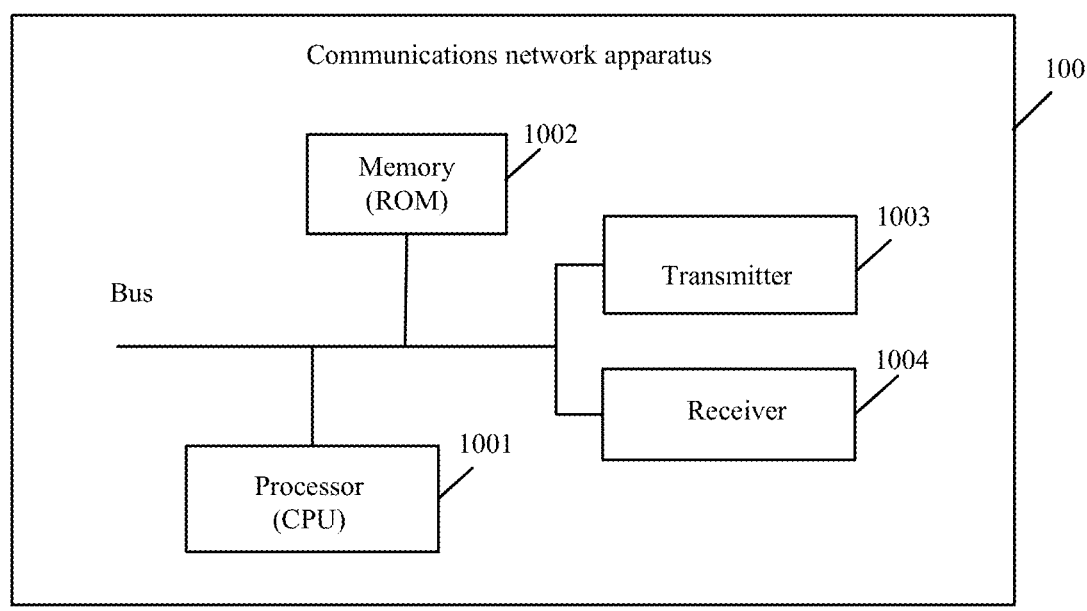
FIG. 6 is a schematic structural diagram of a communications network apparatus according to an embodiment of the present invention.

Based on the same inventive concept, an embodiment of the present invention provides a communications network apparatus 100 (as shown in FIG. 6). The apparatus is configured to implement the methods described in the embodiments in FIG. 3A to FIG. 3C.

Referring to FIG. 6, the communications network apparatus 100 may include: a memory 1002, and a processor 1001, a transmitter 1003, and a receiver 1004 that are coupled with the memory 1002. The transmitter 1003 is configured to send data to an external device. The receiver 1004 is configured to receive data sent by the external device. The memory 1002 is configured to store code for implementing the method described in the foregoing embodiments. The processor 1001 is configured to execute the program code stored in the memory 1002, to:

for a transmission burst transmitted on an unlicensed carrier, reserve at least one SC-FDMA symbol in a subframe of an uplink transmission burst corresponding to the transmission burst, where in the reserved at least one SC-FDMA symbol, user equipment accesses a channel by using a listen-before-talk LBT access mechanism.

In a possible implementation, the processor 1001 may be configured to reserve the at least one SC-FDMA symbol at a start position and/or an end position of each subframe of the uplink transmission burst. In this way, a time gap for accessing the channel through LBT can be reserved for another UE at the start position and/or the end position of each subframe, so as to implement uplink multiplexing for a plurality of UEs.

In a possible implementation, the processor 1001 may be configured to periodically reserve the at least one SC-FDMA symbol at start positions and/or end positions of some subframes of the uplink transmission burst. In this way, a time gap for accessing the channel through LBT can be periodically reserved for another UE at the start positions and/or end positions of the some subframes of the uplink transmission burst, so as to implement uplink multiplexing for a plurality of UEs.

With reference to the first aspect, in a possible implementation, the processor 1001 may be configured to reserve the at least one SC-FDMA symbol at a start position and/or an end position of a specified subframe of the uplink transmission burst.

In some possible implementations, the at least one SC-FDMA symbol may be a low power transmit symbol. Some frequency resources in the low power transmit symbol in this embodiment of the present invention are allowed to be occupied. In addition, on an unoccupied frequency resource in the ABS symbol, the user equipment may access the channel by using the listen-before-talk LBT access mechanism. In this way, this may avoid that a Wi-Fi access point accesses an idle channel through LBT in the reserved at least one SC-FDMA symbol, and consequently LAA-LTE user equipment cannot successfully access the channel (or an access success probability of the LAA-LTE user equipment is reduced).

In some possible implementations, to satisfy a stipulation, about a frequency feature of the low power transmit symbol, of the ETSI, a frequency allowed to be occupied in the low power transmit symbol may be distributed in resource blocks at both ends of an entire system bandwidth.

During specific implementation, the processor 1001 may be further adapted to configure the reserved at least one SC-FDMA symbol by using higher layer configuration signaling (for example, RRC signaling), a physical downlink control channel (PDCCH), or the like, where at least one of the following options is specifically included: a quantity of reserved SC-FDMA symbols, a position of the reserved SC-FDMA symbol in a subframe, a type of the reserved SC-FDMA symbol, and a period and an offset of the reserved SC-FDMA symbol.

During specific implementation, the processor 1001 may be further adapted to configure, by using higher layer configuration signaling (for example, RRC signaling), a physical downlink control channel (PDCCH), or the like, a subframe including the reserved SC-FDMA symbol, where at least one of the following options is specifically included: a quantity of subframes including the reserved SC-FDMA symbol, a position of the subframe including the reserved SC-FDMA symbol in the uplink transmission burst, and a period and an offset of the subframe including the reserved SC-FDMA symbol.

It may be understood that, for steps performed by the processor 1001, refer to the methods described in the embodiments in FIG. 3A to FIG. 3C. Details are not described herein again.

Based on the same inventive concept, an embodiment of the present invention further provides a communications network apparatus. The communications network apparatus includes functional modules configured to perform the methods described in the embodiments in FIG. 3A to FIG. 3C.

Various variation manners and specific examples in the methods described in the embodiments in FIG. 3A to FIG. 3C are also applicable to the communications network apparatus in this embodiment. Based on detailed descriptions of the methods described in the embodiments in FIG. 3A to FIG. 3C, a person skilled in the art may clearly know an implementation method of the signal transmission apparatus in this embodiment. For brevity of this specification, details are not described herein again.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. An uplink transmission method based on a licensed-assisted access (LAA) system, comprising:
    reserving, for a transmission burst transmitted on an unlicensed carrier, at least one single-carrier frequency-division multiple access (SC-FDMA) symbol in a subframe of an uplink transmission burst corresponding to the transmission burst, wherein the at least one SC-FDMA symbol is configured to allow a user equipment to access a channel using a listen-before-talk (LBT) access mechanism, wherein the at least one SC-FDMA symbol is at a position other than a start position of a first subframe of the uplink transmission burst when a channel access operation is performed before the first subframe of the uplink transmission burst, and wherein the at least one SC-FDMA symbol is at a position other than an end position of a last subframe of the uplink transmission burst when no uplink data is transmitted after the last subframe of the uplink transmission burst; and
    configuring the at least one SC-FDMA symbol using higher layer configuration signaling or a physical downlink control channel by configuring a quantity of reserved SC-FDMA symbols, a position of the at least one SC-FDMA symbol in a subframe, a type of the at least one SC-FDMA symbol, or a period and an offset of the at least one SC-FDMA symbol.

2. The uplink transmission method of claim 1, wherein reserving the at least one SC-FDMA symbol comprises reserving at least one SC-FDMA symbol at a start position of each subframe of the uplink transmission burst when no uplink data is transmitted after the last subframe of the uplink transmission burst or an end position of each subframe of the uplink transmission burst when the channel access operation is performed before the first subframe of the uplink transmission burst.

3. The uplink transmission method of claim 1, wherein reserving the at least one SC-FDMA symbol comprises periodically reserving at least one SC-FDMA symbol at start positions of a first portion of subframes of the uplink transmission burst when no uplink data is transmitted after the last subframe of the uplink transmission burst or end positions of a second portion of subframes of the uplink transmission burst when the channel access operation is performed before the first subframe of the uplink transmission burst.

4. The uplink transmission method of claim 1, wherein reserving the at least one SC-FDMA symbol comprises reserving at least one SC-FDMA symbol at a start position of a first specified subframe of the uplink transmission burst when no uplink data is transmitted after the last subframe of the uplink transmission burst or an end position of a second specified subframe of the uplink transmission burst when the channel access operation is performed before the first subframe of the uplink transmission burst.

5. The uplink transmission method of claim 1, wherein the at least one SC-FDMA symbol is a low power transmit symbol, wherein a portion of frequency domain resources in the low power transmit symbol comprises unoccupied frequency resources, and wherein the unoccupied frequency resources are configured to allow the user equipment to access the channel using the LBT access mechanism.

6. The uplink transmission method of claim 5, wherein the portion of frequency domain resources is distributed in resource blocks at both ends of an entire system bandwidth.

7. The uplink transmission method of claim 1, wherein the at least one SC-FDMA symbol is dynamically reserved such that a previous uplink transmission burst and a subsequent uplink transmission burst have different numbers of reserved SC-FDMA symbols than the uplink transmission burst, and wherein each of the reserved SC-FDMA symbols comprises a low power transmit symbol in which a part of a channel is in an idle state.

8. A communications network apparatus, comprising:
    a processor; and
    a memory coupled to the processor and configured to store programming instructions for execution by the processor, wherein the programming instructions cause the processor to:
        reserve, for a transmission burst transmitted on an unlicensed carrier, at least one single-carrier frequency-division multiple access (SC-FDMA) symbol in a subframe of an uplink transmission burst corresponding to the transmission burst, wherein the at least one SC-FDMA symbol is configured to allow a user equipment to access a channel using a listen-before-talk (LBT) access mechanism, wherein the at least one SC-FDMA symbol is at a position other than a start position of a first subframe of the uplink transmission burst when a channel access operation is performed before the first subframe of the uplink transmission burst, and wherein the at least one SC-FDMA symbol is at a position other than an end position of a last subframe of the uplink transmission burst when no uplink data is transmitted after the last subframe of the uplink transmission burst; and
        configure the at least one SC-FDMA symbol using higher layer configuration signaling or a physical downlink control channel by configuring a quantity of reserved SC-FDMA symbols, a position of the at least one SC-FDMA symbol in a subframe, a type of the at least one SC-FDMA symbol, or a period and an offset of the at least one SC-FDMA symbol.

9. The communications network apparatus of claim 8, wherein the programming instructions further cause the processor to reserve at least one SC-FDMA symbol at a start position of each subframe of the uplink transmission burst when no uplink data is transmitted after the last subframe of the uplink transmission burst or an end position of each subframe of the uplink transmission burst when the channel access operation is performed before the first subframe of the uplink transmission burst.

10. The communications network apparatus of claim 8, wherein the programming instructions further cause the processor to periodically reserve at least one SC-FDMA symbol at start positions of a first portion of subframes of the uplink transmission burst when no uplink data is transmitted after the last subframe of the uplink transmission burst or end positions of a second portion of subframes of the uplink transmission burst when the channel access operation is performed before the first subframe of the uplink transmission burst.

11. The communications network apparatus of claim 8, wherein the programming instructions further cause the processor to reserve at least one SC-FDMA symbol at a start position of a first specified subframe of the uplink transmission burst when no uplink data is transmitted after the last subframe of the uplink transmission burst or an end position of a second specified subframe of the uplink transmission burst when the channel access operation is performed before the first subframe of the uplink transmission burst.

12. The communications network apparatus of claim 8, wherein the at least one SC-FDMA symbol is a low power transmit symbol, wherein a portion of frequency domain resources in the low power transmit symbol comprises unoccupied frequency resources, and wherein the unoccupied frequency resources are configured to allow the user equipment to access the channel using the LBT access mechanism.

13. The communications network apparatus of claim 12, wherein the portion of frequency domain resources is distributed in resource blocks at both ends of an entire system bandwidth.

14. The communications network apparatus of claim 8, wherein the at least one SC-FDMA symbol is dynamically reserved such that a previous uplink transmission burst and a subsequent uplink transmission burst have different numbers of reserved SC-FDMA symbols than the uplink transmission burst, and wherein each of the reserved SC-FDMA symbols comprises a low power transmit symbol in which a part of a channel is in an idle state.

15. A computer program product comprising instructions stored on a non-transitory computer-readable medium that, when executed by a processor, cause a communications network apparatus to:
  reserve, for a transmission burst transmitted on an unlicensed carrier, at least one single-carrier frequency-division multiple access (SC-FDMA) symbol in a subframe of an uplink transmission burst corresponding to the transmission burst, wherein the at least one SC-FDMA symbol is configured to allow a user equipment to access a channel using a listen-before-talk (LBT) access mechanism, wherein the at least one SC-FDMA symbol is at a position other than a start position of a first subframe of the uplink transmission burst when a channel access operation is performed before the first subframe of the uplink transmission burst, and wherein the at least one SC-FDMA symbol is at a position other than an end position of a last subframe of the uplink transmission burst when no uplink data is transmitted after the last subframe of the uplink transmission burst; and
  configure the at least one SC-FDMA symbol using higher layer configuration signaling or a physical downlink control channel by configuring a quantity of reserved SC-FDMA symbols, a position of the at least one SC-FDMA symbol in a subframe, a type of the at least one SC-FDMA symbol, or a period and an offset of the at least one SC-FDMA symbol.

16. The computer program product of claim 15, wherein the instructions further cause the communications network apparatus to reserve at least one SC-FDMA symbol at a start position of each subframe of the uplink transmission burst when no uplink data is transmitted after the last subframe of the uplink transmission burst or an end position of each subframe of the uplink transmission burst when the channel access operation is performed before the first subframe of the uplink transmission burst.

17. The computer program product of claim 15, wherein the instructions further cause the communications network apparatus to periodically reserve at least one SC-FDMA symbol at start positions of a first portion of subframes of the uplink transmission burst when no uplink data is transmitted after the last subframe of the uplink transmission burst or end positions of a second portion of subframes of the uplink transmission burst when the channel access operation is performed before the first subframe of the uplink transmission burst.

18. The computer program product of claim 15, wherein the instructions further cause the communications network apparatus to reserve at least one SC-FDMA symbol at a start position of a first specified subframe of the uplink transmission burst when no uplink data is transmitted after the last subframe of the uplink transmission burst or an end position of a specified subframe of the uplink transmission burst when the channel access operation is performed before the first subframe of the uplink transmission burst.

19. The computer program product of claim 15, wherein the at least one SC-FDMA symbol is a low power transmit symbol, wherein a portion of frequency domain resources in the low power transmit symbol comprises unoccupied frequency resources, and wherein the unoccupied frequency resources are configured to allow the user equipment to access the channel using the LBT access mechanism.

20. The computer program product of claim 19, wherein the portion of frequency domain resources is distributed in resource blocks at both ends of an entire system bandwidth.

* * * * *